UNITED STATES PATENT OFFICE.

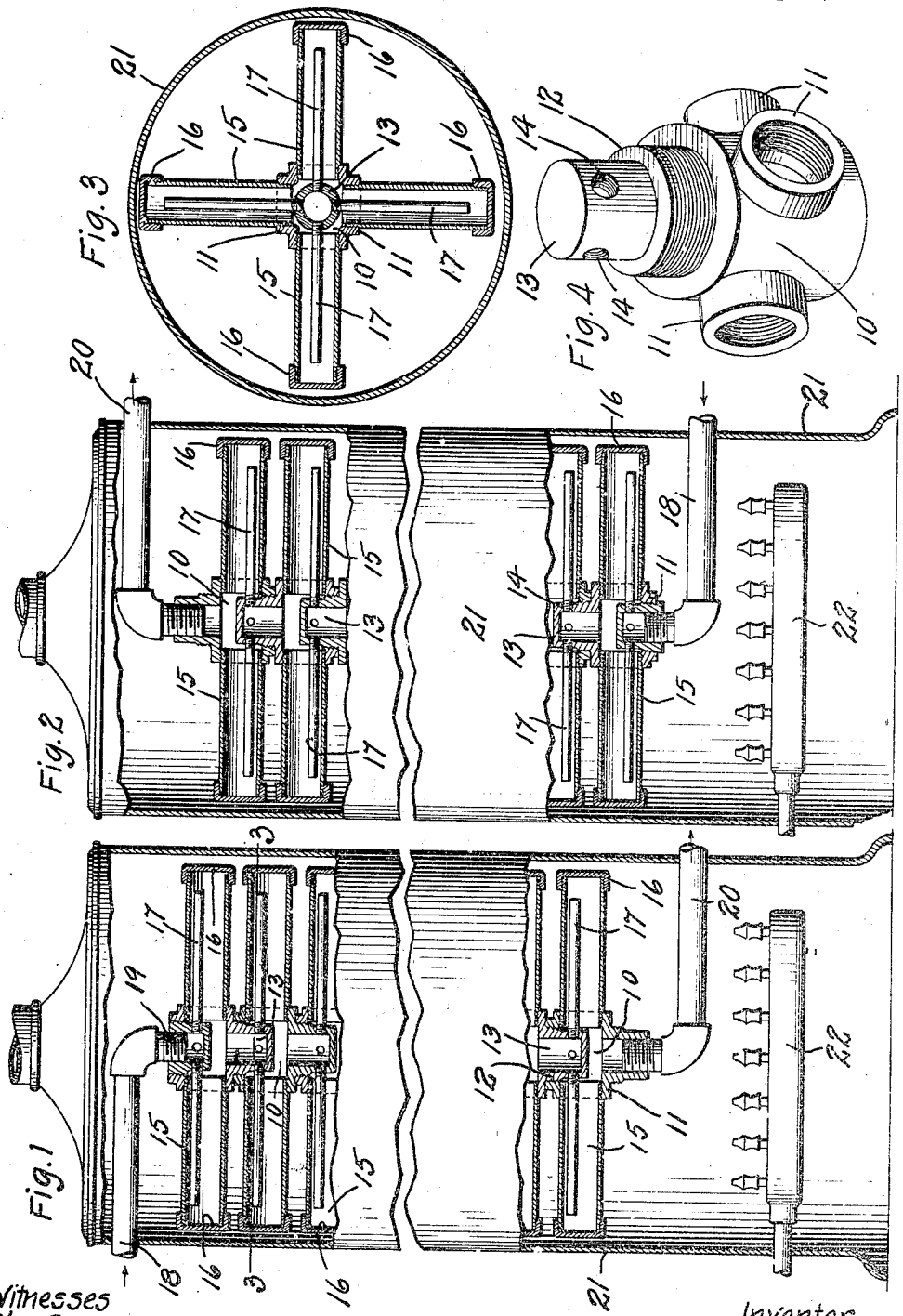

JAMES J. ROHAN, OF ST. LOUIS, MISSOURI, ASSIGNOR TO MISSOURI GAS HEATER AND APPLIANCE COMPANY, OF ST. LOUIS, MISSOURI, A CORPORATION OF MISSOURI.

COMBINED WATER-HEATER AND STEAM-GENERATOR.

1,072,874.  Specification of Letters Patent.  Patented Sept. 9, 1913.

Application filed January 4, 1913. Serial No. 740,161.

*To all whom it may concern:*

Be it known that I, JAMES J. ROHAN, a citizen of the United States, residing at the city of St. Louis, State of Missouri, have invented a certain new and useful Improvement in Combined Water-Heaters and Steam-Generators, of which the following is a full, clear, and exact description, such as will enable others skilled in the art to which it appertains to make and use the same, reference being had to the accompanying drawings, forming part of this specification, in which—

Figure 1 is a side elevational view partly in vertical section of a combined water heater and steam generator of my improved construction, the same being shown adapted for use as an instantaneous water heater. Fig. 2 is a side elevational view partly in section of my improved device, the same being adapted for use as a steam generator. Fig. 3 is a horizontal section taken approximately on the line 3—3 of Fig. 1. Fig. 4 is a perspective view of one of the unions or joint members forming a part of my improved device, and to which the circulating and heating pipes are connected.

This invention relates to new and useful improvements in devices particularly designed for heating water and for the generating of steam, the principal object of my invention being to provide a simple, inexpensive water heater and steam generator, particularly adapted for household use, and which is economical in the consumption of fuel.

A further object of my invention is to construct a combined water heater and steam generator in sections which can be readily assembled or taken apart to facilitate repairing or renewal of parts.

A further object of my invention is to construct a combined water heater and steam generator that is compact and at the same time has a comparatively large area of heating surface in order that water can be very quickly heated and converted into the steam.

To the above purpose my invention consists in certain novel features of construction and arrangement of parts hereinafter more fully described and claimed.

In the construction of my improved apparatus I make use of a series of joint members, each comprising a hollow cylindrical body portion 10, the lower end portion of which is internally screw-threaded. Formed integral with this body portion is a series of outwardly projecting nipples 11, the same being internally threaded. Formed integral with one end of the body portion 10 is a tubular extension 12 which is externally threaded so as to receive the internally threaded lower end of the next adjacent body 10. Formed integral with the collar 12 is a hollow extension 13, through the wall of which is formed a series of threaded apertures 14. A series of these joint members are arranged one above the other with the lower end portion of each body 10 screw seated on the collar 12 of the adjacent joint member. Screw seated in the nipples 11 are the inner ends of horizontally disposed tubes 15 the outer ends of which are closed in any suitable manner, preferably by means of screw caps 16. Arranged within each tube 15 is a comparatively small tube 17, the inner end of which is screw seated in the corresponding one of the openings 14 both ends of said tube 17 being open.

By the arrangement just described, the large tubes 15 connected to each joint member and which tubes form the heating tubes of the device, communicate with the chamber within the body portion 10 to which they are attached and the smaller tubes 17 within said larger tubes and which smaller tubes may be termed, the circulating tubes, communicate with the chamber within the tubular extension 13 of the next adjacent joint member.

Where my improved device is adapted for use as a water heater, the joint members are arranged with the body portions 10 uppermost as seen in Fig. 1, and with the tubular extensions 12 and 13 projecting downwardly into the body portion 10 of the next adjacent joint member.

When my improved device is so arranged a feed water pipe 18 is connected to a tubular plug 19 which is seated in the uppermost one of the joint members and leading from the lowermost one of said joint members is a hot water supply pipe 20.

The device so constructed is preferably inclosed in a suitable shell or housing 21, and arranged therein beneath the device is a suitable gas or hydro-carbon burner 22.

Where the device is utilized as a steam generator the joint members are arranged with the tubular extensions 12 and 13 extending upward into the body portions 10 of the next adjacent joint members as shown in Fig. 2 and when so arranged the supply pipe 18 is located at the bottom of the apparatus, and the pipe 20, which now performs the function of a steam supply pipe, leads from the upper end of the apparatus.

When my improved device is used as a water heater, water from the supply pipe 18 enters the plug 19 and discharges from thence through the uppermost series of small pipes 17 and discharging from the outer ends thereof said water passes inwardly through the uppermost series of heating pipe 15 and passes from thence through the chambers within the uppermost joint member and discharges therefrom into and through the next lower series of small pipes 17. This circulation is continuous downward through the entire series of heating pipes 15 and circulating pipes 17 and during such circulation heat from the burner 22 rising through the shell or housing 21 impinges against said heating pipes 15, thereby rapidly heating the water therein.

The water passing through the heater gradually becomes heated to a comparatively high degree as it travels to the lower end of the device and as it passes through the lower most series of pipes 15 and leaves the device through the supply pipe 20, it is subjected to the direct action of the flames from the burner and therefore said water passes to point of use in a highly heated condition.

By utilizing circulating pipes 17 which are comparatively small, the flow of water through the device is in a measure restricted or retarded and thus said pipes form the function of baffle plates such as are ordinarily used in devices of this character.

When my improved device is used as a steam generator water enters the tubular plug 19 at the lower end of the apparatus and passing through the lowermost series of circulating pipes 17 passes into the lowermost series of heating pipes 15 and from thence said water passes into the chambers within the lowermost union, and said water discharges therefrom through the next adjacent series of pipes 17. The water thus rising throughout the entire device is subjected to the heat of the burner and the steam generator from the water passes from the uppermost series of pipes through the supply pipe leading from the upper end of the apparatus. The various sets or series of heating pipes are radially arranged within the shell or housing, and thus all of said pipes are subjected to the heat from the burner as it passes upwardly through said shell or housing.

The entire volume of water within the device is divided up into a number of comparatively small portions and for this reason the entire volume can be very quickly and economically heated.

By forming the heater in sections, the same can be readily assembled or taken apart, thus facilitating repairing or renewal of parts.

A water heater and steam generator of my improved construction is very simple, very compact, is particularly adapted for household use, and can be operated with great economy for the reason that all of the heating tubes are subjected to the direct action of the heat from the burner in the lower portion of the apparatus.

It will be readily understood that minor changes in the size, form and construction of the various parts of my improved device may be made and substituted for those herein shown and described without departing from the spirit of my invention, the scope of which is set forth in the appended claims.

I claim:

1. In a combined heater and steam generator a vertically disposed sectional column formed by a series of hollow joint members, a portion of each of which extends into and is screw-seated in an adjacent joint member, a series of heating pipes connected to each section of the column, and a series of circulating pipes connected to each section of the column.

2. In a combined heater and steam generator a vertically disposed sectional column formed by a series of hollow joint members, a portion of each of which extends into and is screw-seated in an adjacent joint member, a series of heating pipes connected to each section of the column, and a series of circulating pipes connected to each section of the column, which circulating pipes are located within the heating pipes.

3. In an apparatus of the class described, a combined heating and circulating element, comprising a hollow joint member, a tubular extension thereon which occupies a position within the body of the next adjacent joint member when two of said joint members are properly assembled, a series of heating pipes connected to the joint member, and a series of circulating pipes connected to the hollow extension.

4. In a combined heater and steam generator, a vertically disposed sectional column formed of a series of hollow joint members, a portion of each of which extends into and is screw-seated in an adjacent joint member, a series of heating pipes connected to each section of the column, a series of circulating pipes connected to each section, means for delivering water to the joint member at one end of the device, and means for withdrawing water or steam from the joint member at the opposite end of the device.

5. In a combined heater and steam generator, a vertically disposed sectional column formed of a series of hollow joint members, a portion of each of which extends into and is screw-seated in an adjacent joint member, a series of heating pipes connected to each section of the column, a series of circulating pipes connected to each section, means for delivering water to the joint member at one end of the device, means for withdrawing water or steam from the joint member at the opposite end of the device, and a housing inclosing the sectional column and the heat and circulating pipes.

In testimony whereof I hereunto affix my signature in the presence of two witnesses, this eighth day of October, 1912.

JAMES J. ROHAN.

Witnesses:
  ROBERT A. CRABB,
  PHILIP A. ROHAN.